Patented Mar. 18, 1941

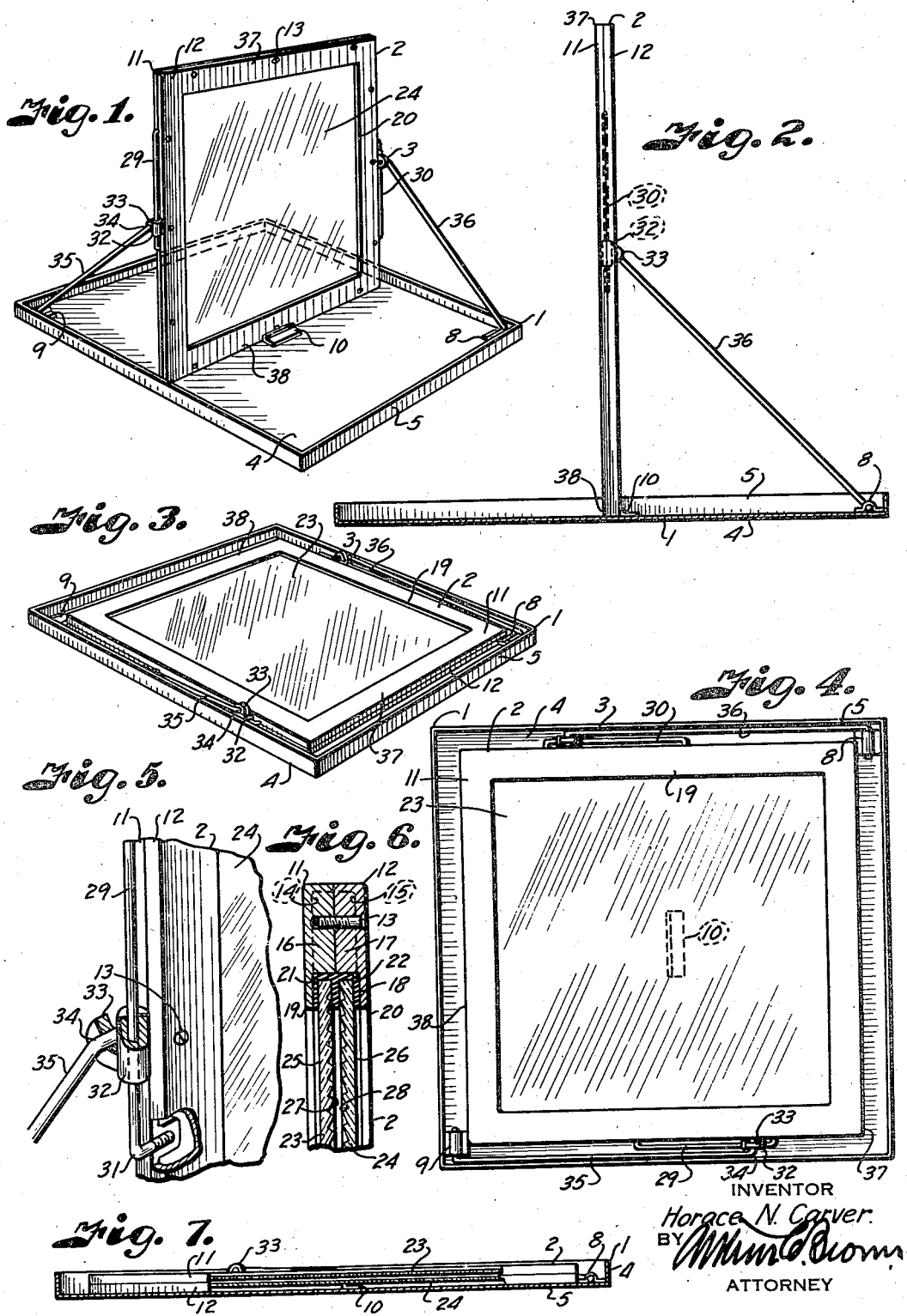

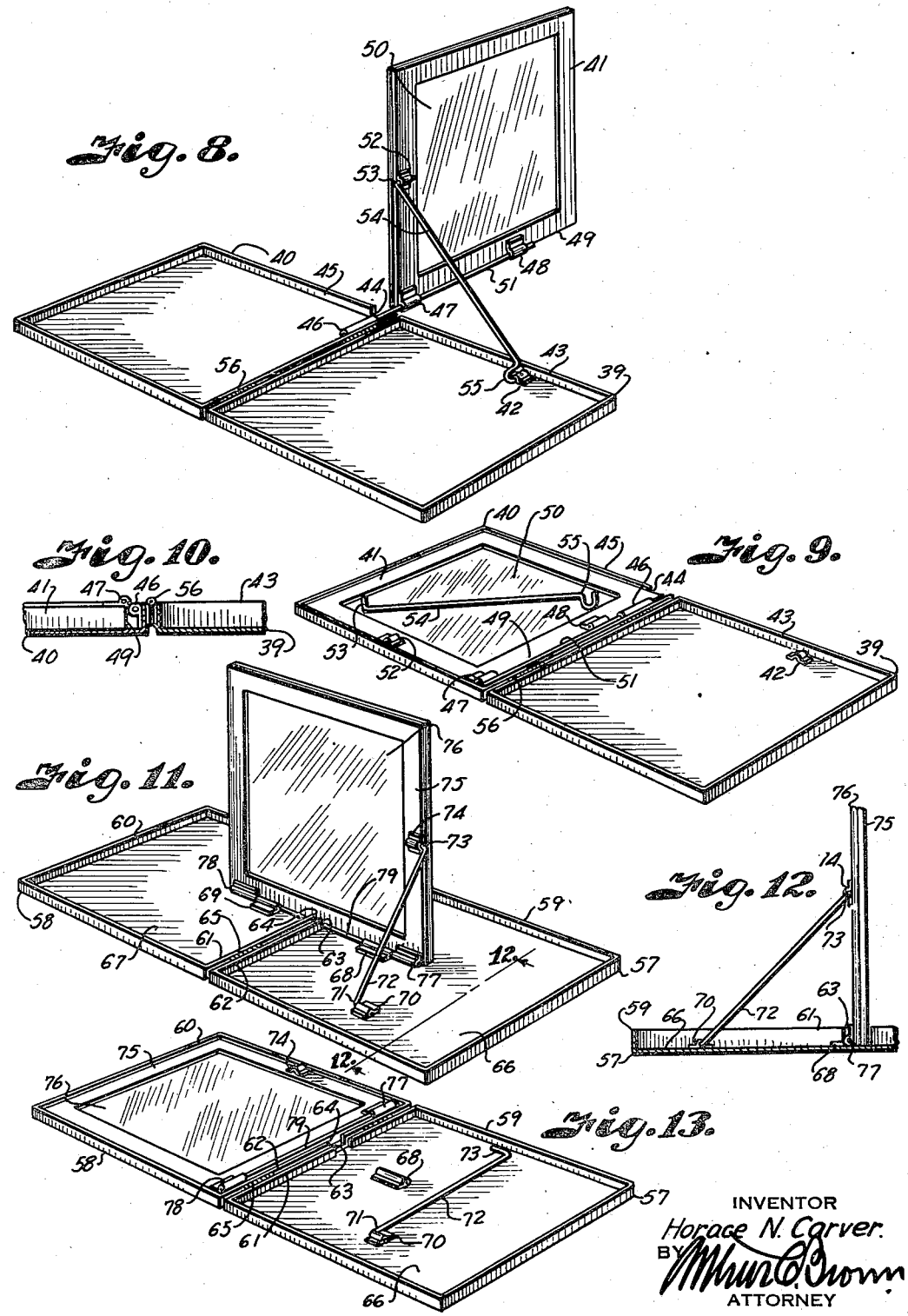

2,235,284

UNITED STATES PATENT OFFICE 2,235,284

SIGNALING DEVICE

Horace N. Carver, Wichita, Kans.

Application April 21, 1938, Serial No. 203,347

4 Claims. (Cl. 88—78)

This invention relates to signaling devices and more particularly to a portable signal adapted to be conveniently placed on highways and similar thoroughfares for warning motorists and the like of obstructions on a highway.

It is ordinarily difficult for operators of vehicles such as loaded trucks to pull off the road when it becomes necessary to make repairs on the vehicles under their control. Should the motor of a truck fail or the tires need changing, the stalled or otherwise stationary vehicle creates a hazard on the road, not only to approaching motorists, but also to the truck operators and the property under their control.

It is the principal object of the present invention to provide a signal of the character commonly known as a "road flare" which is capable of reflecting and/or refracting light rays generated by the lights of approaching vehicles, back approximate their source to warn the occupants of those vehicles of the presence of obstructions on roads.

Other important objects of the present invention are to provide a collapsible light reflecting and/or refracting signal of sturdy and durable construction capable of withstanding shocks and jars without damage to the signal; to so design the signal that it is difficult to tip over accidentally; to provide a housing for the reflector or refracting element of the signal which also acts as a supporting standard therefor; to provide a compact and easily operable signal of a high degree of efficiency; to provide a protective mounting for the reflector or light refracting element of the signal; to provide for movably mounting the signaling element in the housing member to adapt the housing member for supporting the signaling element in upright condition thereon; and to provide improved parts and arrangements of parts making up a signaling device according to the present invention.

In accomplishing these and other objects of the present invention, I have provided improved details of structure, the preferred forms of which are illustrated in the accompanying drawings, wherein:

Fig. 1 is a perspective view of a signaling device embodying the features of the present invention.

Fig. 2 is a side elevational view of the signaling device, the housing for the signaling element being shown in longitudinal cross-section to better illustrate the manner of operatively positioning the signaling element therein.

Fig. 3 is a perspective view of the signaling device in collapsed condition adapted to be stored.

Fig. 4 is a plan view of the signaling device in collapsed condition.

Fig. 5 is a detail perspective view of one of the signaling element slide rails particularly illustrating its construction.

Fig. 6 is a detail vertical cross-section through a portion of the signaling element illustrating a suitable type of light ray reflecting and refracting member.

Fig. 7 is a side elevational view of the signaling device in collapsed condition, the housing member being shown in longitudinal cross-section and a portion of the frame being broken away to illustrate the arrangement of the signaling plates relative thereto.

Fig. 8 is a perspective view of a modified form of signaling device embodying the features of the present invention.

Fig. 9 is a perspective view of the signaling device illustrated in Fig. 8, the signaling element being shown in collapsed inoperative condition with the cover open.

Fig. 10 is a detail longitudinal cross-section through the signaling device housing members when in opened condition, particularly illustrating the arrangement of the sockets on the housing members and signaling element.

Fig. 11 is a perspective view of a further modified form of invention illustrating the signaling element mounted in operative condition longitudinally relative to the housing members when in opened condition.

Fig. 12 is a fragmentary detail vertical cross-section through one of the housing members on the line 12—12, Fig. 11.

Fig. 13 is a perspective view of the signaling device illustrated in Figs. 11 and 12 illustrating the signaling element in collapsed inoperative condition with the cover open.

Referring more in detail to the drawings:

The preferred form of invention generally includes, as illustrated in Figs. 1 to 7, a housing member 1, a signaling element 2 and means 3 interconnecting the signaling element and housing member for selectively positioning the signaling element in operative and inoperative condition relative to the housing.

More particularly, the housing 1 consists of a tray-like member having a bottom wall 4 provided with an upwardly extending peripheral flange 5. Socket members 8 and 9 are provided on the inner face of the housing member preferably in oppositely diagonally disposed positions thereon, and an anchoring member 10 is provided on the inner face of the housing member preferably intermediately disposed between the socket members 8 and 9.

The signaling element 2 preferably comprises a frame composed of a pair of mating members 11 and 12 as particularly illustrated in Fig. 6. The mating frame members are suitably secured together as by fastening devices 13 and preferably have substantially hollow interiors indicated by the dotted lines 14 and 15 in which spaced alignable bosses 16 and 17 are provided for seating, in the present instance, an E-shaped gasket 18 which may be formed of sponge rubber or similar suitable material, the inner edges 19 and 20 of the frame members 11 and 12 cooperating with the edges 21 and 22 of the frame member bosses in forming a seat for the gasket 18.

Plate members 23 and 24 are mounted in spaced relation in the gasket 18, the peripheral edges thereof being anchored by the gasket, the plates being adapted to reflect and refract light rays impinging thereagainst in opposite directions back approximate the source of incidence of the light rays.

The plates 23 and 24 are preferably composed of rolled colored glass having suitable outer faces 25 and 26 and preferably are provided with prismatic inner faces 27 and 28.

The means 3 for interconnecting the signal element with the housing member preferably comprises slide rails 29 and 30 fixed to opposite ends of the signaling element 2, one of which is particularly illustrated in Fig. 5. The slide rails comprise rods having the ends 31 thereof bent inwardly and mounted in suitable recesses in the signaling element frame members and having a substantially cylindrical member 32 slidably mounted on the rails. The member 32 is provided with an eye member 33 or the like into which each of the ends 34 of each of a pair of brace rods 35 and 36 is insertable. The other ends of the brace rods 35 and 36 are turned inwardly for engagement within the sockets 8 and 9 provided on the housing member. As a matter of practice, the housing member ends of the rods 35 and 36 are placed in the sockets and the sockets are spot welded or otherwise suitably secured to the housing member to provide a substantially permanent seat for the bracing rods.

Assuming a signaling device to be constructed as described, the operation thereof is as follows:

The signaling device is normally stored in the positions illustrated in Figs. 3, 4 and 7. In moving the signaling element 2 to operative condition in the housing 1, the top edge 37 of the signaling element is grasped and pulled upwardly and the bottom edge 38 thereof follows inwardly into engagement with the anchoring member 10 in the housing. Such movement of the signaling element effects sliding movement of the cylindrical members 32 on the rails 29 and 30 in opposite directions and lifts the bracing rods 35 and 36 into the position illustrated in Figs. 1 and 2 in such a manner that the signaling element is braced in erected condition, the anchoring member 10 preventing movement of the signaling element in one direction, the brace rod 35 preventing movement of the signaling element in the opposite direction, and the bracing rod 36 cooperating with the brace rod 35 and anchor 10 to prevent collapse of the signaling element into the housing.

When it is desired to collapse the signaling element for storage, the brace rod 35 is manually lifted upwardly, the lower end 38 of the signaling element may be positively forced in the direction of the housing socket 9, and the brace rod 36 is moved downwardly, whereupon the signaling element is free to pivot on its connection with the ends 34 of the brace rods to position the same horizontally and lower it into the housing.

In Figs. 8, 9 and 10, a modified form of signaling device is illustrated wherein mating housing members 39 and 40 are provided and a signaling element 41 substantially similar to the signaling element 2 previously described is provided, the signaling element being adapted for enclosure within the mating housing members when not in use.

In this instance, the housing member 39 is provided with a socket 42 adjacent one side flange 43 thereof and the opposite housing member is provided with an opening 44 in one side flange 45 thereof. A socket member 46 is mounted on the inner face of the housing member 40 adjacent the opening 44 thereof and socket members 47 and 48 are provided along one edge 49 of the frame 50 of the signaling element 41, the sockets 47 and 48 being alignable with the socket 46 in the housing member 40 to the end that a rod 51 or similar retaining device may be inserted through the aligned sockets for connecting the signaling element to the housing member.

In order to operatively position the signaling element, a socket member 52 is provided thereon which is adapted to receive an inturned end 53 of a brace rod 54 provided at its other end with a hook-like structure 55 adapted for engagement with the socket 42 in the housing member 39, the brace rod serving to effect interengagement of the signaling element and housing member for maintaining the same in upright operative position.

The operation of a signaling device constructed as described in connection with Figs. 8 to 10 is as follows:

When the signaling device is to be used for its intended purpose, and assuming the signaling element to be contained within the housing members, one of said members is hinged outwardly relative to the other on the hinges 56, which interconnect the same, to coplanar position as illustrated in Fig. 9. The brace rod 54 is then removed from the housing and the end 55 thereof hooked into the socket 42. The signaling element 41 is then removed from its seat in the housing member 40 and positioned outside the housing member adjacent the opening 44 and socket 46. The rod 51, which may also be contained in the housing, is then inserted through the sockets 46 to 48 to pivotally attach the signaling element to the housing member 40. The end 53 of the brace rod 54 is then inserted in the socket 52 on the signaling element and the signaling element is thereupon in operative condition. When the signaling device has served its purpose, the operation is reversed to collapse the same and the signaling device as a whole may be stored in a suitable manner.

In Figs. 11 to 13, a further modified form of signaling device is illustrated wherein mating traylike housing members 57 and 58 are provided which have laterally extending peripheral flanges 59 and 60, the adjacent end portions 61 and 62 of which are provided with aligned openings 63 and 64 as particularly shown in Fig. 13. The housing members are hinged together as indicated at 65 and the inner faces 66 and 67 of the housing members are each provided with an anchoring socket 68 and 69, Fig. 11, in longitudinal alignment with the openings 63 and 64 of the housing member flanges. In this instance, another socket member 70 is provided on one of the housing members in spaced relation to the other socket member for receiving the laterally turned end 71 of a brace rod 72, the other oppositely turned end 73 of the rod being engageable in a socket 74 mounted on the frame 75 of a signaling element 76 similar to that described in connection with the other forms of invention.

Anchoring members 77 and 78 having suitable sockets therein are provided on another portion of the frame member 75 of the signaling element which are longitudinally alignable with the anchor members 68 and 69 on the housing members. In this instance, also, a rod or similar retaining device 79 is provided which is insertable through the sockets of the members 68—69 and 77—78 to anchor the signaling element longitudinally relative to the housing members when the housing members are in opened condition, as shown in Fig. 11.

In this instance, the operation of a signaling device is substantially similar to that of the device illustrated in Figs. 8 to 10, that is, when the signaling element is to be used and assuming it is enclosed within the housing members, one of the housing members is hinged outwardly relative to the other on the hinges 65 to position the housing members in coplanar position. The signaling element 76 is manually removed in a suitable manner from the housing member 57 for example, and turned in such a manner that its frame portion having the members 77 and 78 thereon, may be seated on the housing members in the openings 63 and 64 thereof adjacent the anchoring members 68 and 69. The rod 79 may then be inserted through the adjacent socket members to form a pivotal mounting and an anchor for the signaling element. The rod 72 may then be applied to the anchoring sockets 70 and 74 on the housing member 57 and signaling element frame as shown in Figs. 11 and 12, to brace the signaling element and housing members relative to each other and maintain the signaling element in operative condition. A reversal of the stated operation may be employed to collapse the signaling element and enclose the same within the housing members 57 and 58.

It is apparent that the signaling devices constructed in accordance with the present forms of invention may be placed either in front of, at the side of or behind a vehicle on a road, and that the signaling element may be faced toward either direction of approaching traffic on a highway to warn the occupants of approaching vehicles of the presence of an obstruction on the highway. The signaling devices of the present invention are rigid and durable and will withstand rough treatment. The housing members not only enclose the signaling element but form a standard therefor of substantial area and thus form an effective base for the signaling element which prevents accidental collapse of the signaling element.

These devices are very compact and may be conveniently stored in any type of vehicle. Light rays may be reflected and/or refracted from either side of the signaling element and a highly efficient, very economical signaling element of general utility is provided.

What I claim and desire to secure by Letters Patent is:

1. A road signal of the character described including a housing substantially in the form of a tray having an outer surface adapted to rest flat in horizontal position upon the ground and an inner upwardly facing surface normally forming a support for a frame, spaced sockets on the inner surface of said tray, a frame movably mounted on the inner surface of the tray and adapted to carry a signaling element, rails mounted at opposite sides of said frame, and rods each having one of their ends pivotally mounted in said sockets and their other ends slidably mounted on said rails for allowing said frame to be moved relative to the tray and for maintaining said frame in moved relation to said tray.

2. A road signal of the character described including a housing substantially in the form of a tray, spaced sockets on the inner surface of said tray, an anchor member disposed intermediately on the inner surface of the tray relative to said sockets, a frame adapted to carry a signaling element movably mounted on the inner surface of the tray, rails mounted at opposite sides of said frame, and rods each having one of their ends pivotally mounted in said sockets and their other ends slidably mounted on said rails, a portion of said frame being removably engageable with the anchor member to limit movement thereof in one direction when moved relative to the tray, said rods being cooperative with said anchor member to maintain the frame in upright condition relative to the housing.

3. In a road signal of the character described, a housing substantially in the form of a tray and adapted to rest on the ground, said housing having a socket on the upper surface thereof, a frame adapted to carry a signaling element adapted to normally rest on the upper surface of the tray and adapted for edge support on the tray at one of its ends, a rail mounted on said frame, and a rod having one of its ends pivotally mounted in said socket and its other end slidably mounted on said rail, whereby the frame may be moved relative to the tray under control of the rod and rail, the rod cooperating with the rail and socket to maintain the frame in moved operative condition.

4. In a road signal, a housing having a flat body member adapted to rest on the ground and having a peripheral upstanding flange about the body member, a frame adapted to carry a signaling element of a length and breadth approximately that of the body member and of a thickness approximately that of said flange, whereby the frame may normally rest flat on the housing and be substantially housed thereby, means movably engaged with said frame and pivotally engaged with said housing for allowing the frame to be moved outwardly relative to said housing under control thereof, and means on the housing removably engageable with a portion of the frame, when the frame is moved outwardly relative to the housing, for limiting movement of the frame in one direction and cooperating with said movably and pivotally engaged means in anchoring the frame in outwardly moved relation to the housing.

HORACE N. CARVER.